United States Patent
Truong et al.

(10) Patent No.: US 8,588,840 B2
(45) Date of Patent: Nov. 19, 2013

(54) SYSTEM AND METHOD FOR DISTRIBUTED POWER CONTROL IN A COMMUNICATIONS SYSTEM

(75) Inventors: Kien Trung Truong, Austin, TX (US); Young Hoon Kwon, San Diego, CA (US); Philippe Sartori, Algonquin, IL (US)

(73) Assignee: FutureWei Technologies, Inc., Plano, TX (US)

( * ) Notice: Subject to any disclaimer, the term of this patent is extended or adjusted under 35 U.S.C. 154(b) by 292 days.

(21) Appl. No.: 13/242,993

(22) Filed: Sep. 23, 2011

(65) Prior Publication Data

US 2012/0083203 A1    Apr. 5, 2012

Related U.S. Application Data

(60) Provisional application No. 61/388,339, filed on Sep. 30, 2010.

(51) Int. Cl.
   *H04B 7/00* (2006.01)

(52) U.S. Cl.
   USPC ........... 455/522; 455/127.1; 455/13.4; 455/7; 370/252; 370/318

(58) Field of Classification Search
   USPC ........... 455/522, 127.1, 13.4, 13.1, 67.11, 69, 455/10, 452.2, 518, 115.1, 126, 11.1, 7; 370/252, 315, 318, 242, 311, 338, 339, 370/277, 278, 329
   See application file for complete search history.

(56) References Cited

U.S. PATENT DOCUMENTS

| | | | |
|---|---|---|---|
| 8,417,255 B2 * | 4/2013 | Dayal et al. | 455/452.2 |
| 8,457,674 B2 * | 6/2013 | Sandhu et al. | 455/522 |
| 2005/0255808 A1 | 11/2005 | Ahmed et al. | |
| 2007/0207827 A1 * | 9/2007 | Bi et al. | 455/522 |
| 2008/0119216 A1 | 5/2008 | Lee et al. | |
| 2008/0198906 A1 | 8/2008 | Kim et al. | |
| 2008/0214182 A1 | 9/2008 | Wang et al. | |
| 2008/0227561 A1 | 9/2008 | Dahl | |
| 2009/0053994 A1 | 2/2009 | Senarath et al. | |
| 2010/0067427 A1 | 3/2010 | Choudhury | |
| 2011/0007702 A1 * | 1/2011 | Chin et al. | 370/329 |
| 2011/0143806 A1 * | 6/2011 | Song et al. | 455/522 |
| 2011/0170424 A1 * | 7/2011 | Safavi | 370/242 |
| 2012/0149425 A1 * | 6/2012 | Choi et al. | 455/522 |
| 2013/0188507 A1 * | 7/2013 | Dayal et al. | 370/252 |

* cited by examiner

*Primary Examiner* — Sujatha Sharma
(74) *Attorney, Agent, or Firm* — Slater & Matsil, L.L.P.

(57) ABSTRACT

A system and method for distributed power control in a communications system are provided. A method for relay node operations includes transmitting a signal at a transmit power level on a first channel from a relay node to a user equipment, receiving a message comprising a first indication of channel quality of the first channel at the transmit power level, and determining a second indication of channel quality of a second channel between a communications controller and the relay node, where the first channel and the second channel are in a same multi-hop communication path. The method also includes altering the transmit power level of the first channel based on the first indication of channel quality and the second indication of channel quality to converge the channel quality of the first channel to a convergence value.

32 Claims, 5 Drawing Sheets

SYSTEM AND METHOD FOR DISTRIBUTED POWER CONTROL IN A COMMUNICATIONS SYSTEM

This application claims the benefit of U.S. Provisional Application No. 61/388,339, filed on Sep. 30, 2010, entitled "Method for Distributed Power Control at the Relay Nodes in Wireless Relay Networks," which application is hereby incorporated herein by reference.

TECHNICAL FIELD

The present invention relates generally to digital communications, and more particularly to a system and method for distributed power control in a communications system.

BACKGROUND

Relay nodes may be introduced into a communications system to extend coverage and/or to improve data rate. For example, in a downlink of a relay-based communications system, a base station (BS) (also commonly referred to as a controller, communications controller, NodeB, enhanced NodeB (eNB), and so on) may transmit to a relay node (RN), which in turn retransmits to a mobile station (MS) (also commonly referred to as a subscriber, terminal, user, User Equipment (UE), and so forth).

Typically, in a multi-user communications system, inter-link interference may have a significant impact on overall performance of the communications system. For example, inter-link interference may significantly reduce the system performance, such as a sum of the data rates of links simultaneously utilizing the same radio frequency resource.

Power control is a well established technique for improving the sum of the data rate of multi-user communications systems. A variety of power control techniques and protocols have been proposed for power control in multi-user communications systems. However, they tend to be optimized for single-hop power control algorithms and do not typically apply to communications systems with relay nodes since such systems are multi-hop systems.

SUMMARY OF THE INVENTION

These and other problems are generally solved or circumvented, and technical advantages are generally achieved, by example embodiments of the present invention which provide a system and method for distributed power control in a communications system.

In accordance with an example embodiment of the present invention, a method for relay node communication is provided. The method includes transmitting a signal at a transmit power level on a first channel from a relay node to a user equipment, receiving a message including a first indication of channel quality of the first channel at the transmit power level, and determining a second indication of channel quality of a second channel between a communications controller and the relay node, where the first channel and the second channel are in a same multi-hop communication path. The method also includes altering the transmit power level of the first channel based on the first indication of channel quality and the second indication of channel quality to converge the channel quality of the first channel to a convergence value.

In accordance with another example embodiment of the present invention, a method for communications controller operations is provided. The method includes setting, at a communications controller, a first transmit power level for a transmission made by a relay node over a first channel between the relay node and a user equipment, where the relay node is controlled by the communications controller. The method also includes transmitting, over a second channel between the communications controller and the relay node, a signal at a second transmit power level, where the first channel and the second channel are in a same multi-hop communication path. The method further includes initiating an execution of a power control algorithm at the relay node to alter the first transmit power level based on a first indication of channel quality of the first channel and a second indication of channel quality of the second channel to converge the channel quality of the first channel to the channel quality of the second channel. The method additionally includes stopping the power control algorithm at the relay node when a stopping condition is met.

In accordance with another example embodiment of the present invention, a relay node is provided. The relay node includes a transmitter, a receiver, and a processor coupled to the transmitter and to the receiver. The transmitter transmits a signal at a transmit power level on a first channel from the relay node to a user equipment. The receiver receives a message including a first indication of channel quality of the first channel at the transmit power level. The processor determines a second indication of channel quality of a second channel between a communications controller and the relay node, where the first channel and the second channel are in a same multi-hop communication path, and alters the transmit power level of the first channel based on the first indication of channel quality and the second indication of channel quality to converge the channel quality of the first channel to a convergence value.

In accordance with another example embodiment of the present invention, a communications controller is provided. The communications controller includes a processor, and a transmitter coupled to the processor. The processor sets a first transmit power level for a transmission made by a relay node over a first channel between the relay node and a user equipment, where the communications controller controls the relay node. The processor also initiates an execution of a power control algorithm at the relay node, where the power control algorithm alters the first transmit power level based on a first indication of channel quality of the first channel and a second indication of channel quality of a second channel between the communications controller and the relay node to converge the channel quality of the first channel to the channel quality of the second channel, where the first channel and the second channel are in a same multi-hop communications path, and stops the power control algorithm at the relay node when a stopping condition is met. The transmitter transmits a signal at a second transmit power level over the second channel.

One advantage disclosed herein is that multiple communications hops are considered when designing power control, thereby improving system performance (such as the sum of the data rate, also referred to as system throughput).

A further advantage of exemplary embodiments is that the power control is fully distributed and does not require a centralized controller that may increase implementation costs, as well as communications overhead and protocol latency. Thereby, the impact to existing communications systems may be minimized.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to providing power control in a multi-hop communications system. For example, after initiating channel measurements of a second hop, a relay node transmits a signal to help a mobile station perform the channel measurements. The relay node uses the information related to the channel measurements and attempts to update the power level of transmissions to the mobile stations by converging the channel quality of the second hop with a convergence value. At a base station, initial transmit power levels are set for the relay node, and a power control algorithm that updates the power level of transmissions to mobile stations by converging the channel quality of a second hop with the convergence value is initiated.

The present invention will be described with respect to example embodiments in a specific context, namely a multi-user communications system with relay nodes. The invention may be applied, however, to standards compliant communications systems, such as those that are compliant with Third Generation Partnership Project (3GPP) Long Term Evolution (LTE), IEEE 802.16, WiMAX, and so on, technical standards, as well as non-standards compliant communications systems that support relay nodes. The invention is also applicable to wireless local area network (LAN) systems, such as the IEEE 802.11 family of technical standards.

Figure 1:
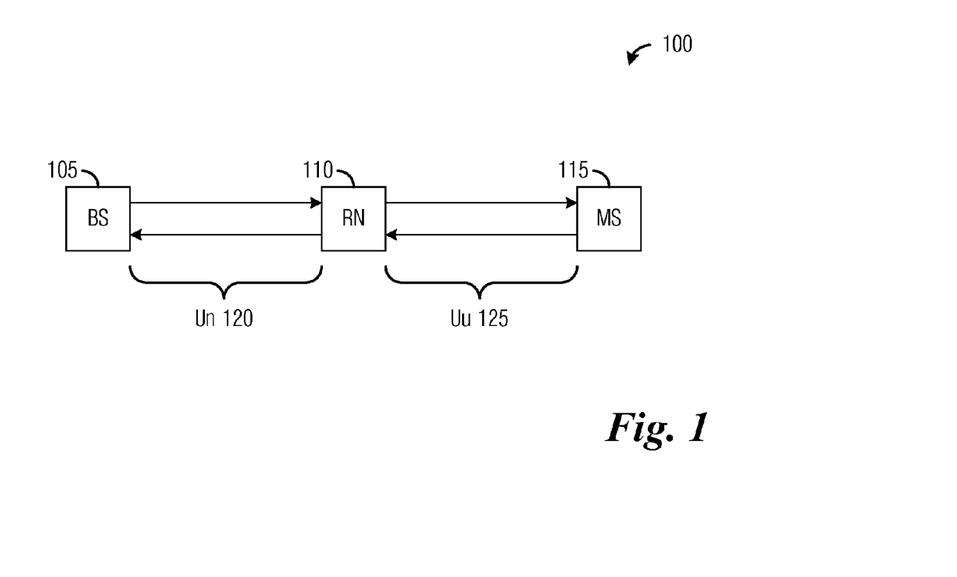
FIG. 1 illustrates an example communications system according to example embodiments described herein.

FIG. 1 illustrates a communications system 100. Communications system 100 includes a BS 105 that controls the communications of communications devices that it is serving. Communications system 100 also includes a relay node (RN) 110. A RN is considered as a tool to improve, e.g., the coverage area of high data rate communications, group mobility, temporary network deployment, the cell-edge throughput, and/or to provide coverage in new areas. The RN is wirelessly connected to a wireless communications network via a BS, such as BS 105.

Communications system 100 also includes an MS 115. MS 115 may be a communications device that may allow an operator to connect to a service, such as voice service, data service, multimedia service, and so on. As shown in FIG. 1, BS 105 has allocated some resources to RN 110, which in turn, may allocate some resources (provided by BS 105) to MS 115. Communications between BS 105 and RN 110 may be made over a communications link (uplink and/or downlink directions) referred to as a Un link 120 or a wireless backhaul link, while communications between RN 110 and MS 115 may be made over communications link (uplink and/or downlink directions) referred to as a Un link 125 or an access link.

While it is understood that communications systems may employ multiple BSs capable of communicating with a number of MSs and RNs, only one BS, one MS, and one RN are illustrated for simplicity. In particular, BS 105 may also communicate with other RNs (not shown on the figure), and RN 110 may communicate with other MSs (not shown on the figure).

Figure 2:
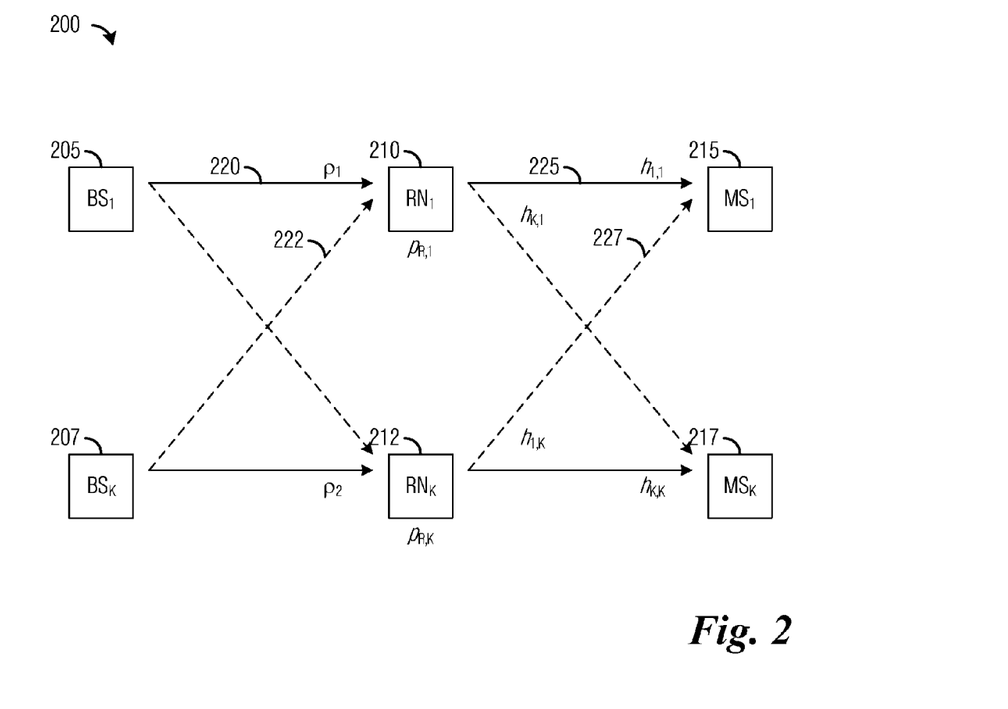
FIG. 2 illustrates an example model of a K-user two-hop interference channel in a multi-user communications system according to example embodiments described herein.

FIG. 2 illustrates a model 200 of a K-user two-hop interference channel in a multi-user communications system. Model 200 includes K BSs, including $BS_1$ 205 and $BS_K$ 207. Each BS may communicate through a RN, including $RN_1$ 210 and $RN_K$ 212, to a MS, including $MS_1$ 215 and $MS_K$ 217. For example, $BS_1$ 205 communicates to $MS_1$ 215 through $RN_1$ 210. Similarly, $BS_K$ 207 communicates to $MS_K$ 217 through $RN_K$ 212. Generally, it is also possible for a BS to directly communicate with a MS (e.g., over a direct link). This configuration is not shown here. It is noted however that the inclusion of direct links is considered to be well understood by those of ordinary skill in the art of the example embodiments.

Generally, in a multi-user communications system, a communications device, such as a RN or a UE, may receive not only transmissions intended for it, but also transmissions not intended for it. As an example, consider $RN_1$ 210 as it receives a transmission intended for it from $BS_1$ 205 (shown as solid line 220), as well as a transmission not intended for it from $BS_K$ 207 (shown as dashed line 222). Similarly, $MS_1$ 215 may receive a transmission intended for it from $RN_1$ 210 (shown as solid line 225), as well as a transmission not intended for it from $RN_K$ 212 (shown as dashed line 227).

Let $\rho_1$ be the received signal to interference plus noise ratio (SINR) from $BS_1$ 205 to $RN_1$ 210, $\rho_2$ be the received SINR from $BS_K$ 207 to $RN_K$ 212, $p_{R,1}$ be the transmit power of $RN_1$ 210, $p_{R,K}$ be the transmit power of $RN_K$ 212, $h_{1,1}$ be the channel model between $RN_1$ 210 and $MS_1$ 215, $h_{K,K}$ be the channel model between $RN_K$ 212 to $MS_K$ 217, $h_{K,1}$ be the channel model between $RN_1$ 210 and $MS_K$ 217, and $h_{1,K}$ be the channel model between $RN_K$ 212 and $MS_1$ 215. Also, define a total transmit power for the RNs as $$P_R=(p_{R,1},\ldots,p_{R,K}),$$

and a data rate over a hop as a function of channel quality x as $$C(x)=\log_2(1+x).$$

It is noted that the channel quality x for a channel may be defined as a function of the channel model h for the channel and the transmit power values p for the channel.

Typically, the receipt of transmissions not intended for a communications device at the communications device will have a negative impact on the performance of the communications device. Usually, the unintended transmission may show up as interference and/or noise in the intended transmission, thereby potentially causing errors.

Therefore, there is a desire to reduce interference and/or noise in a multi-user communications system, and to adapt the link of each user to maximize each user's data rate under the current radio conditions. However, in a communications system with RNs and multi-hop communications, an interference environment may be significantly different from an interferer environment in a communications system without RNs and communications occur only in single hops. For instance, a transmission from a BS to a MS may involve a transmission on a backhaul link from the BS to a RN, while on an access link, the RN and possibly the BS may transmit to the MS. Additionally, data rates on the backhaul link and the access link may be quite different.

A technique that may be used to improve performance in a multi-user communications system by reducing interference and/or noise is power control. Power control can reduce interference as well as ensure better transmission efficiency by adapting data rates of each link.

However, in a multi-user communications system with RNs, a power control technique may need to consider both the transmit power of the RNs and of the MSs. Hence, a centralized power control technique may require a considerable amount of feedback information, which may negatively impact communications system performance due to increased overhead. Therefore, a power control technique that may consider RN and MS transmit power as well as reduce feedback information is needed.

Generally, when all RNs of a multi-user communications system are transmitting at their highest transmit power levels, the data rate over the hops (e.g., two hops in a single RN transmission scenario with a first hop between the BS and the RN and a second hop between the RN and the MS) is not balanced. The mismatch in the data rate is intuitively suboptimal since it is well recognized that when sharing access to a resource, the optimal end to end rate is achieved with the data rates over the hops are equal.

Therefore, an objective of the power control techniques presented herein is to have the data rates over the hops to be equal or as equal as possible over communications channels. Another objective of the power control techniques presented herein is to ensure that a sum of the data rates over the hops does not decrease, thereby ensuring convergence of the power control techniques.

Hence, referencing the notation defined in the discussion of FIG. 2, it is desirable to determine $P_R$ to maximize the sum of end-to-end achievable rates, which may be expressible as $$\max_{P_R} \sum_{k=1}^{K} \min\left\{ C(\rho_k), C\left( \frac{p_{R,k}|h_{k,k}|^2}{\sum_{m \neq k} p_{R,m}|h_{k,m}|^2 + \sigma_k^2} \right) \right\},$$

with individual power constraints at RNs expressible as $$P_{R,k}^{min} \leq p_{R,k} \leq P_{R,k}^{max},$$

and where $\sigma_k^2$ is the noise power spectral density.

Figure 3:
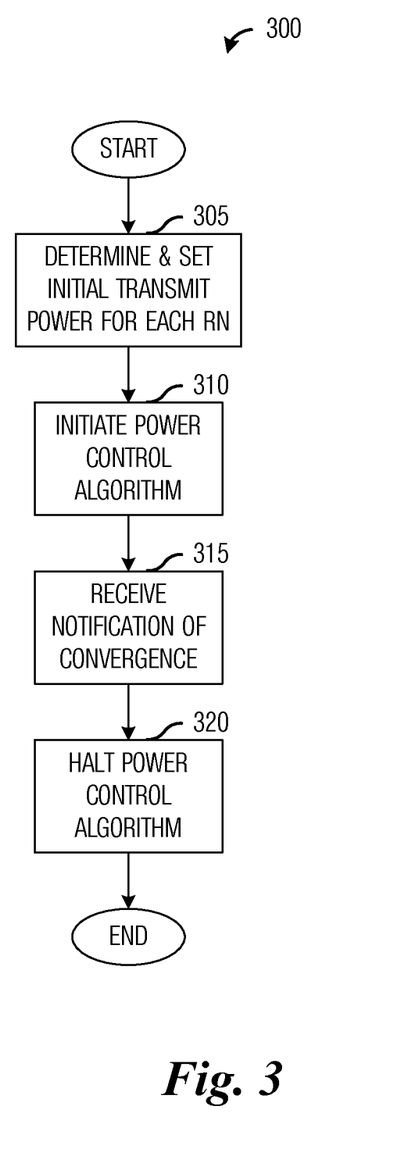
FIG. 3 illustrates an example flow diagram of BS operations in performing power control according to example embodiments described herein.

FIG. 3 illustrates a flow diagram of BS operations 300 in performing power control. BS operations 300 may be indicative of operations occurring in a BS, such as BS 105, as the BS performs power control for communications devices, such as RNs, served by the BS. The power control performed by the BS may be targeted for power control of multi-hop communications, i.e., communications involving at least one RN. BS operations 300 may occur while the BS is in a normal operating mode. BS operation may also occur while some units are directly connected with the BS, and are not using any RN to communicate.

BS operations 300 may begin with the BS determining and setting an initial transmit power level for RNs under its control (block 305). According to an example embodiment, the BS may determine the initial transmit power level for the RNs to be the RNs' maximum transmit power level. Alternatively, the RN may use information from prior transmissions to set up its own initial transmit power level. The BS may also determine that a previous RN's power distribution may be applied to the RN, with the transmit power level set to a maximum power level for a RN allocating resources, or zero for a RN not being allocated resource, as an example.

According to an example embodiment, if the BS controls multiple RNs, the BS may set the transmit power levels of each of the multiple RNs to the same value. Alternatively, each RN's transmit power level may be set independently. However, as discussed above, if a RN is not allocated resources, then the RN's transmit power level may be set to zero.

The BS may initiate the power control algorithm in the RNs (block 310). According to an example embodiment, the power control algorithm alters the transmit power of the RNs based on channel quality information of the BSs to RNs channels and the RNs to MSs channels to converge the channel quality of the RNs to MSs channel to a convergence value, e.g., the channel quality of the BSs to RNs channel. In order to ensure convergence, each RN controlled by the BS should perform the power control algorithm. According to an example embodiment, the BS may initiate the power control algorithm in the RNs by broadcasting an instruction to the RNs initiating the power control algorithm. Alternatively, the BS may broadcast a message specifying a time to start the power control algorithm to the RNs. Alternatively, the BS may broadcast a message to the RNs, the message specifying an event, wherein upon the event's occurrence the RN is to start the power control algorithm. Examples of the event may include a special message, a synchronization signal, an addition or deletion of a RN, and so forth.

After initiating the power control algorithm, the BS may receive notification regarding the convergence of the power control algorithm from the RNs (block 315). The BS may halt the power control algorithm at the RNs when a stopping condition has been met (block 320). Examples of the stopping condition include the BS receiving notifications of convergence from all of the RNs that it is controlling, when a time interval permitted for convergence has elapsed, or when the RNs have performed a specified number of iterations of the power control algorithm. Alternatively, the stopping condition has been met when the BS has received convergence notifications from some of the RNs that it is controlling, when some of its RNs have preformed a specified number of iterations, when the time interval has elapsed, or combinations thereof.

The BS may halt the power control algorithm by broadcasting an instruction to the RNs to halt the power control algorithm. Alternatively, the BS may broadcast a message specifying a time to halt the power control algorithm to the RNs. Alternatively, the BS may broadcast a message to halt the power control algorithm after a current iteration to the RNs.

BS operations 300 may be configured to occur periodically, at specified times, or upon an occurrence of an event. A measured error rate meeting a specified error threshold, a sum of the data rates meeting a specified data rate threshold, a hybrid automatic repeat requested acknowledgement and/or negative acknowledgement rate meets an acknowledgement threshold, or so on, may be examples of events.

According to an example embodiment, if there are multiple BSs in a communications system, then the multiple BSs may be configured to perform power control at or about the same time. For example, the multiple BSs may initiate the power control algorithm at a specified time. Alternatively, if an event (such as an error rate reaching a first threshold, a Hybrid Automatic Repeat Requested Negative Acknowledgement rate reaching a second threshold, a change in the number of RNs or MSs, and so forth) occurs at one or more BSs in the multiple BSs, then the multiple BSs may initiate the power control algorithm.

Figure 4:
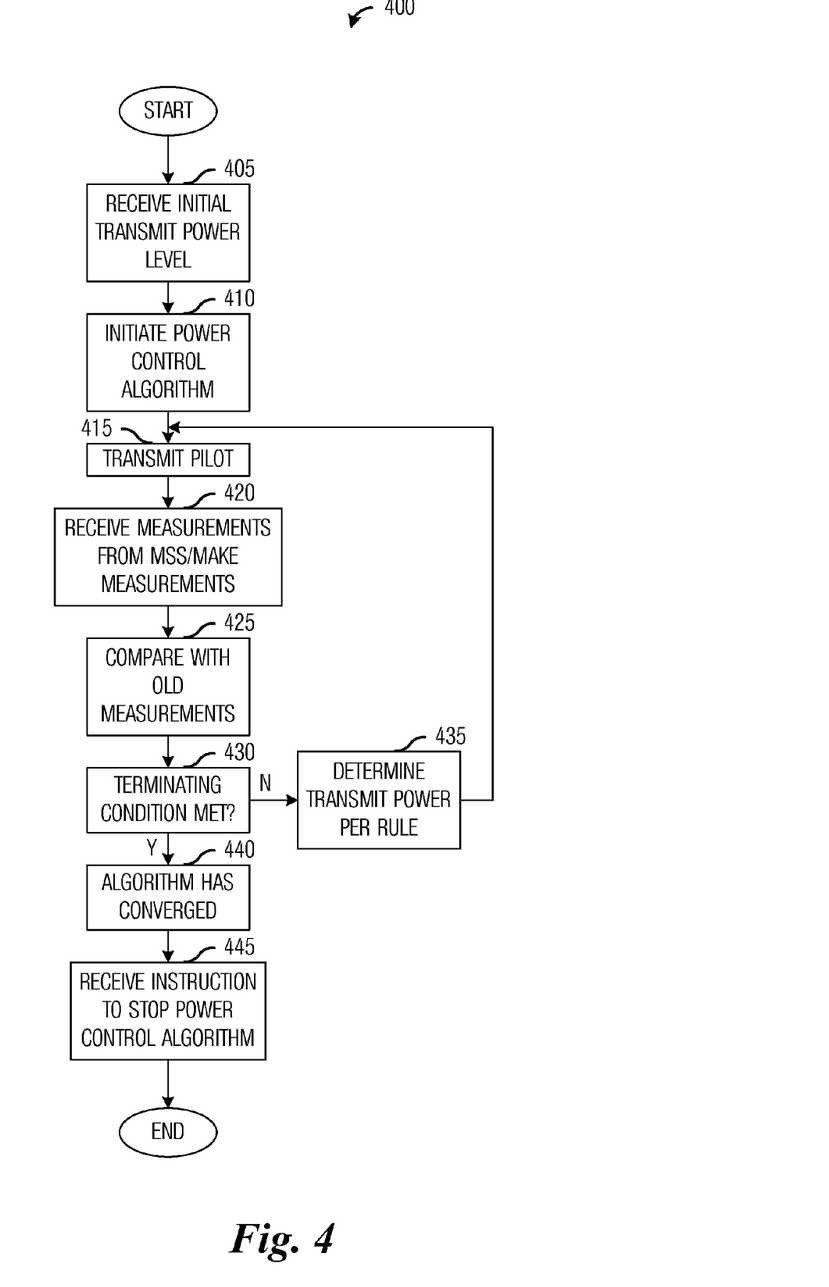
FIG. 4 illustrates an example flow diagram of RN operations in performing power control according to example embodiments described herein.

FIG. 4 illustrates a flow diagram of RN operations 400 in performing power control. RN operations 400 may be indicative of operations occurring in a RN, such as RN 110, as the RN performs power control to converge the channel quality of the RN to MSs channels to a convergence value, e.g., the channel quality of the BS to RN channel, which may be achieved by maximizing data rates of hops over its multi-hop communications as a result. Alternatively, the convergence of the channel quality of the RN to MSs channels to the convergence value, which may be achieved by maximizing a sum of data rates of hops over its multi-hop communications. RN operations 400 may occur while the RN is in a normal operating mode.

RN operations 400 may begin with the RN receiving an initial transmit power level setting from the BS that is controlling it (block 405). The RN may configure its own transmit power level based on the transmit power level setting received from the BS. Alternatively, the RN may configure its own transmit power level based on historical information and/or information from other RNs.

The RN may initiate the power control algorithm (block 410). According to an example embodiment, the RN may receive a message broadcast by the BS to initiate the power control algorithm. Alternatively, the RN may receive a message broadcast by the BS specifying a time to start the power control algorithm and then at the specified time, the RN may initiate the power control algorithm. Alternatively, the RN may receive a message broadcast by the BS specifying an event, wherein upon the event's occurrence, the RN may initiate the power control algorithm.

According to an example embodiment, initiation of the power control algorithm comprises the RN instructing each of its MSs to begin making measurements of a channel between itself and the RN and then report information based on the channel measurement to the RN. The RN may specify a periodicity of the channel measurements to be made by the MSs, or the RN may specify specific times when the MSs are to make the channel measurements. The MSs may continue to make measurements of the channel until instructed to stop. Alternatively, the RN may configure the MSs to make a channel measurement upon an occurrence of an event. Then, when the event occurs, the MSs may make a channel measurement. Exemplary events may include a message comprising a trigger, a transmission of a specified message, a synchronization signal, a frame or superframe start or end, or so on.

The RN may transmit a pilot, reference signal, preamble, or so on, which may help the MSs to measure the channel (block 415). According to an example embodiment, the RN may transmit a pilot signal that all of the MSs may use to measure the channel between the RN and the MS, i.e., the second hop or the access link. Alternatively, the RN may transmit precoded reference signals and/or preambles that only a single MS or a single group or type of MS uses to measure the channel between the RN and the MS. If the RN transmits a precoded reference signal and/or preamble, then the RN may transmit multiple different reference signals and/or preambles for its MSs if the RN is serving multiple MSs.

The RN may receive information regarding the measurement of the second hop channels from each of the MSs (block 420). According to an example embodiment, the RN may receive an indication of channel quality, such as signal to interference plus noise ratio (SINR) information and/or signal to noise ratio (SNR) information from the MSs. Alternatively, the RN may receive other indications of channel quality from the MSs, including but not limited to a received signal strength value, a measured bit error rate, a measured frame error rate, channel state information, channel statistics, functions of channel statistics, and so forth. The information may be quantized to help reduce feedback overhead.

In addition to receiving information regarding the measurement of the second hop channels from each of the MSs, the RN may also make a measurement of a channel between the BS and the RN, i.e., the first hop or the backhaul link (block 420). Alternatively, since the RN is typically stationary in nature, the first hop channel between the BS and the RN generally does not change significantly over time. Therefore, the RN may measure the first hop channel between the BS and itself a priori and store it for subsequent use. The measurement may be an indication of channel quality, such as an SINR measurement, an SNR measurement, a received signal strength value, a measured bit error rate, a measured frame error rate, or so on.

According to an example embodiment, the indication of channel quality may also comprise power control commands (or power control recommendations). The RN may receive power control commands (or power control recommendations) from the MSs instead of actual measurements of the channels from the MSs. The power control commands or the power control recommendations may specify a change in the transmit power level of the RN or an actual transmit power level of the RN. As an example, comparing its current measurement of the channel with its previous measurement(s) of the channel, the MS may know that it desires the RN to increase it's transmit power level to the MS. Hence the MS may transmit a power control command (or a power control recommendation) to the RN to increase it's transmit power level. Similarly, the MS may transmit a power control command or a power control recommendation to the RN to decrease it's transmit power level if the current measurement of the second hop channel so indicates.

According to an example embodiment, the RN may receive the indication of channel quality from a MS if the MS determines that the indication of channel quality would result in the RN adjusting its transmit power level. For example, if the measurement of the second hop channel in a given iteration is about the same as the measurement of the second hop channel in a prior iteration, then the MS may elect to not transmit the indication of channel quality in order to reduce feedback overhead since the indication of channel quality would not likely result in a change in the transmit power level for the RN with respect to the MS.

The RN may compare the indication of channel quality, e.g., information regarding the measurement of the channels from the MSs against previously received information regarding the measurement of the channels from the MSs (block 425). In other words, at iteration i, the RN may compare the information from iteration i versus the information from iteration i-1, where i is an integer value. As an example, the RN may compute a change in the information from each MS, e.g., information from iteration i—information from iteration i-1, to compare the information regarding the measurement of the channel from the MSs.

The RN may perform a check to determine if a terminating condition has been met (block 430). Examples of the terminating condition include a convergence of the channel quality to a convergence value (for example, the channel quality of the second hop channel converging to the channel quality of the first hop channel), change between successive channel qualities, such as SINR values or SNR values, being less than a threshold, a convergence of the power control algorithm at the MS, and so on. The threshold may be a predetermined value that if met would require the RN to adjust the transmit power level of the RN with respect to the MS. If the change is not less than the threshold, then the RN may determine the transmit power of the RN with respect to the MS (block 435).

According to an example embodiment, the RN may determine the transmit power of the RN with respect to the MS based on the indications of channel quality of the second hop channel and the indication of channel quality of the first hop channel. The RN may determine the transmit power of the RN with an intent of having the channel quality of the second hop channels converge to a convergence value, such as the channel quality of the first hop channel, as an example.

As discussed previously, altering the transmit power of the RN may have an impact on the channel quality of the second hop. The change in the transmit power may move the channel quality of the second hop closer to or further away from the convergence value. Generally, increasing the transmit power of the RN is expected to increase the channel quality of the second hop. However, this is not always the case. For example, if channel coherence time is lower than power control feedback delay, then the channel quality of the second hop may actually decrease if the transmit power of the RN is increased.

According to an example embodiment, the RN may determine the transmit power of the RN with the intent of having the channel quality of the second hop channels converge to the channel quality of the first hop channel by substantially equalizing an achievable data rate of a first channel between the BS and the RN with an achievable data rate of a second channel between the RN and the MS. It is noted that the channel quality of a channel may be an indicator of an achievable data rate on the channel. As an illustrative example, let R1 be the achievable data rate of the first channel between the BS and the RN and R2 be the achievable data rate of the second channel between the RN and the MS. The RN may determine the transmit power of the RN with respect to the MS by substantially equalizing R1 with R2.

As another illustrative example, consider a situation with two interfering two-hop paths, with a first two-hop path involving a path between BS1, RN1, and MS1 and a second two-hop path involving a path between BS2, RN2, and MS2. Furthermore, R11 may be defined as the achievable data rate of the first channel between BS1 and RN1, R12 may be defined as the achievable data rate of the second channel between RN1 and MS1, R21 may be defined as the achievable data rate of the first channel between BS2 and RN2, and R22 may be defined as the achievable data rate of the second channel between RN2 and MS2. Then, the RN1 may determine the transmit power of RN1 by substantially equalizing R11 with R12 and the RN2 may determine the transmit power of RN2 by substantially equalizing R21 with R22. It is noted that interference between the two two-hop paths may be accounted for in the equalizing the achievable data rates of each of the two-hop paths.

Generally, it may not be possible to fully equalize the achievable data rate of the first channel with the achievable data rate of the second channel due to factors such as variations in components which may prohibit transmitters of different devices to transmit at precisely equal power levels, dynamically varying operating environments which may produce continuously changing instantaneous data rates, and so forth. Therefore, it may be sufficient to equalize the achievable data rate of the first channel with the achievable data rate of the second channel to an acceptable margin, which may be predetermined, for example. The margin may be set based on factors such as available resources, relative frequency of the equalization process, desired performance levels, and so on.

Substantially equalizing the achievable data rate of the first channel with the achievable data rate of the second channel may involve ensuring that there is no (or very little) transmission inefficiency and that a proper amount of transmit power is used for the data rates of the first channel and the second channel. Generally, there may be several techniques that may be used to equalize the achievable data rates of the first channel and the second channel. A first technique may include adjusting the transmit power level. As an example, the transmit power level may be decreased or increased to alter the achievable bit rate (a form of data rate) on one or both of the channels. It is noted that the any unused power may be used to transmit to other MSs and not be lost. A second technique may include adjusting an amount of resources (e.g., time resources, frequency resources, or both time and frequency resources) allocated to one or both of the channels. By changing the amount of resources allocated, the achievable bit rate may be increased or decreased. Other techniques that may be used to equalize the achievable data rates include maximizing the achievable data rates on the first channel and the second channel, maximizing coverage area, adjusting the achievable data rates for the first channel and the second channel until they are equal (at least to a degree that two different communications devices may have equal achievable data rates), minimizing power consumption, and so forth, as examples. A detailed description of an example embodiment for determining the transmit power of the RN with respect to the MS is provided below.

However, if terminating condition has been met (e.g., the change is less than the threshold), then the RN may determine that the power control algorithm has converged for the MS (block 440) and the RN may report to the BS that the power control algorithm has converged for the MS (block 445).

According to an example embodiment, instead of reporting to the BS each time the power control algorithm has converged for a MS, the RN may wait until all of its MSs have converged, a timer representing a maximum allowed time for the power control algorithm operation has elapsed, or the MSs have performed a maximum allowed number of iterations, and then report to the BS that the power control algorithm has converged.

According to an example embodiment, determining the transmit power of the RN with respect to the MS may proceed as follows. For notational convenience, let K be the number of RNs. Let $P_k^{max}$ be the maximum transmit power at $RN_k$ and $P_k^{min}$ be the minimum transmit power at $RN_k$. Without loss of generality, it may be assumed at the range $[P_k^{max}, P_k^{min}]$ is the allowable transmit power range at $RN_k$. It is noted that the power control algorithm presented herein is iterative in nature and let N be a predefined maximum number of iterations. Furthermore, let $a_k$ be the SINR of the k-th first hop channel and $b_k^{(n)}$ be the SINR of the second hop channel; and $p_k^{(n)}$ be the transmit power of $RN_K$ in the n-th iteration for n=1, ..., N.

In general, for a given channel coding scheme and a given multi-antenna transmission scheme, an achievable data rate on a channel is determined in part by the channel's quality (e.g., its SINR) as well as its allocated transmit power. The communications devices may be able to infer the data rate on the channel, usually using the channel's quality. As an illustrative example, considering a multi-carrier system, a technique such as an Exponential Effective SINR Mapping method (EESM) may be used to derive a raw bit rate that can be carried on a channel. The actual bit rate may then be inferred by subtracting various overheads, such as, reference sequence overhead, control channel overhead and so forth. Furthermore, a transmitter of a communications device may adapt its transmission parameters, such as, modulation, channel coding rate, transmission rank, and so on, so that the chosen bit rate corresponds to the channel's quality.

It is noted that $a_k$ may be known at relay node k for k=1, ..., K, before the start of the power control algorithm. Alternatively, relay node k may measure $a_k$ as needed. Then, at an initial step (with n=1), it may be assumed that the RNs are transmitting at their maximum transmit power ($p_k^{(1)}$= $P_k^{max}$). However, the power control algorithm may be initialized with any possible combination of transmit power levels at the RNs. However, by initializing the transmit power level at the maximum transmit power, it may be ensured that the sum of the end-to-end achievable data rates does not decrease after each iteration, with the sum of the data-rate performance after a last iteration being dependent upon the initialization.

As discussed previously, there is a mechanism for informing the RNs regarding the start of the power control algorithm. For example, the BS may send a notification bit to all of the RNs to inform them of the start. The RNs may then transmit pilots, reference signals, preambles, or so forth, for the MSs. After estimating the received SINR of the channel from an associated RN based on the pilots, reference signals, preambles, and so on, each MS may send back the estimated received SINR ($b_k^{(1)}$) to the associated RN, for example, over a feedback channel.

In an n-th step, where 2≤n≤N, each RN has the knowledge of $a_k$, $b_k^{(n-1)}$, and $p_k^{(n-1)}$. Based on the knowledge of the RN, each RN may update its own transmit power level as $$p_k^{(n)} = \max\left\{P_k^{min}, \min\left\{p_k^{(n-1)}, \frac{a_k}{b_k^{(n-1)}} p_k^{(n-1)}\right\}\right\}.$$

Hence, the transmit power level of the RN at the n-th iteration may be the smaller of either the transmit power level of the RN at the (n−1)-th iteration scaled by a ratio of the channel qualities of the first hop to the second hop or the transmit power level of the RN at the (n−1)-th iteration or a minimum transmit power level of the RN.

Then, in the (n+1)-th iteration, the channel quality of the second hop may be provided by the MS to the RN, with the channel quality being based on transmissions made by the RN at the transmit power level determined in the n-th iteration.

It is noted that in practice, a power margin could be used to account for transmission errors, or to act as a safety margin, and for instance, instead of using $$\frac{a_k}{b_k^{(n-1)}} p_k^{(n-1)}$$

in the equation above, an additional factor a could be added such that the equation above becomes:

$$p_k^{(n)} = \max\left\{P_k^{min}, \min\left\{p_k^{(n-1)}, \alpha \frac{a_k}{b_k^{(n-1)}} p_k^{(n-1)}\right\}\right\}.$$

A typical value for α may be 1 (0 dB) or 2 (3 dB).

After updating transmit power levels, the RNs may continue with another iteration of the power control algorithm by transmitting pilots, reference signals, preambles, or so on, at the update transmit power levels. The MSs estimate the received SINR ($b_k^{(n)}$) and send the estimated received SINR back to their associated RNs.

In each iteration, there may be more than one RN that changes its transmit power level, therefore, both the desired signal power and the sum interference power observed at the MSs are changed. Hence, the channel qualities of the second hop channels are changed. However, it may be shown that the transmit power level at a RN is non-increasing after each iteration and that the sum of the end-to-end data rates is non-decreasing after each iteration. Therefore, the power control algorithm is guaranteed to converge (i.e., the channel quality of the second hop channel converges to the channel quality of the first hop channel) if the number of iterations is allowed to approach infinity and that the sum of the end-to-end data rates does not get worse.

It is noted that by definition of the transmit power update rule, the transmit power level at a RN is non-increasing after each iteration. In other words, $p_k^{(n)} \le p_k^{(n-1)}$ for all n≥0.

It is also noted that since the transmit power level at a RN is non-increasing, a side benefit of the power control algorithm is a reduction of the total power consumption at the RNs.

Figure 5:
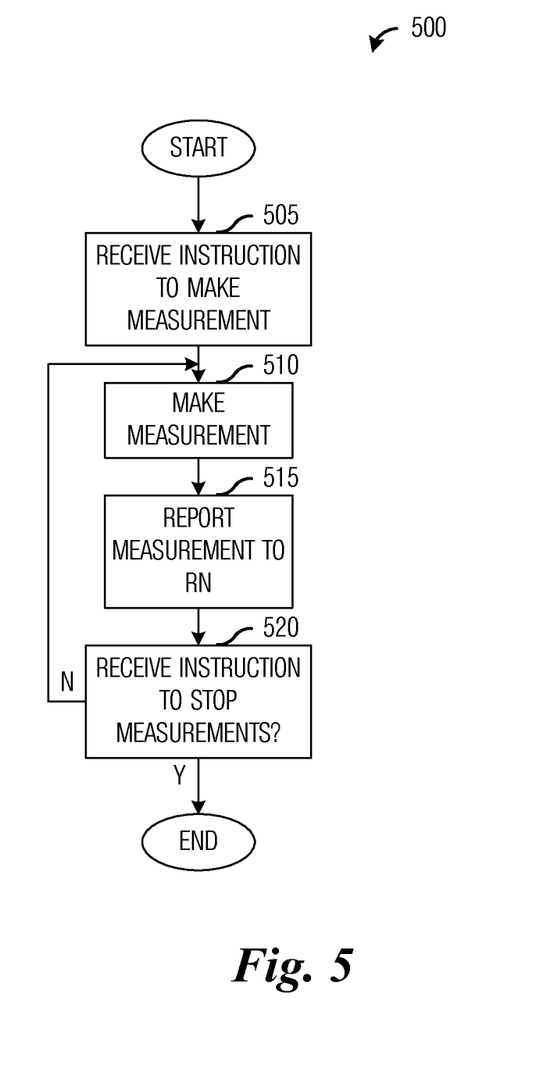
FIG. 5 illustrates an example flow diagram of MS operations in performing power control according to example embodiments described herein.

FIG. 5 illustrates a flow diagram of MS operations 500 in performing power control. MS operations 500 may be indicative of operations occurring in a MS, such as MS 115, as the MS performs power control to maximize a data rate of hops over its multi-hop communications. MS operations 500 may occur while the MS is in a normal operating mode.

MS operations 500 may begin with the MS receiving instruction from an RN serving it to begin making measurements of a second hop channel between the RN and the MS (block 505). According to an example embodiment, the RN may specify a periodicity of the channel measurements to be made by the MS, or the RN may specify specific times when the MS are to make the channel measurements. The MS may continue to make measurements of the second hop channel until instructed to stop. Alternatively, the RN may configure the MS to make a channel measurement upon an occurrence of an event. Then, when the event occurs, the MS may make a channel measurement. Exemplary events may include a message comprising a trigger, a transmission of a specified message, a synchronization signal, a frame or superframe start or end, or so on.

The MS may make the measurement of the second hop channel (block 510). According to an example embodiment, in order to assist the MS in making the measurement of the second hop channel, the RN may transmit pilots, reference signals, preambles, or so on. The signals transmitted by the RN may be broadcast signals that may be used by any MS in making its measurement of the channel or the signals may be precoded for a specific MS or a specific group or type of MSs.

The MS may report information about the channel measurement to the RN (block 515). According to an example embodiment, the information about the channel measurement comprises a SINR value, a SNR value, a received signal strength value, a measured bit error rate, a measured frame error rate, or so on. Alternatively, the MS may send other types of information including but not limited to channel state information, channel quality indicators, channel statistics, functions of channel statistics, and so forth. The information may be quantized to help reduce feedback overhead.

According to an example embodiment, the MS may report a power control command or (a power control recommendation) to the RN. As an example, comparing its current measurement of the channel with its previous measurement(s) of the channel, the MS may know that it desires the RN to increase it's transmit power level to the MS. Hence the MS may transmit a power control command (or a power control recommendation) to the RN to increase it's transmit power level. Similarly, the MS may transmit a power control command (a power control recommendation) to the RN to decrease it's transmit power level if the current measurement of the channel.

According to an example embodiment, instead of sending the information regarding the measurement of the second hop channel (or power control command or power control recommendation) to the RN each time a channel measurement is made, the MS may send the information (or power control command or power control recommendation) only if the MS determines that the information (or the power control command or power control recommendation) would result in the RN adjusting its transmit power level. For example, if the measurement of the second hop channel in a given iteration is about the same as the measurement of the second hop channel in a prior iteration, then the MS may elect to not transmit the information (or the power control command or power control recommendation) in order to reduce feedback overhead since the information (or the power control command or power control recommendation) would not likely result in a change in the transmit power level for the RN with respect to the MS.

The MS may perform a check to determine if it has received an instruction from the RN to stop making channel measurements (block 520). If it has not received an instruction to stop making channel measurements, then the MS may return to block 510 to make another channel measurement. If it has received an instruction to stop making channel measurements, then the MS may stop making channel measurements.

Figure 6:
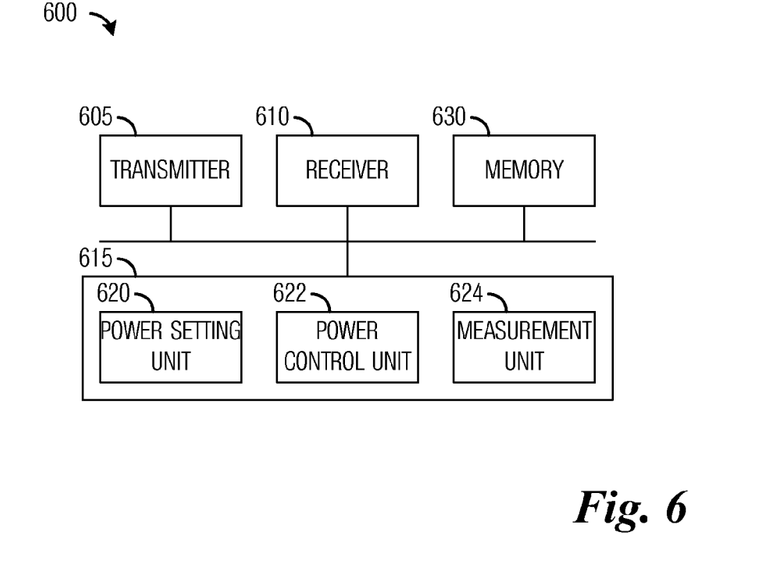
FIG. 6 illustrates an example first communications device according to example embodiments described herein.

FIG. 6 provides an illustration of a communications device 600. Communications device 600 may be an implementation of a BS. Communications device 600 may be used to implement various ones of the embodiments discussed herein. As shown in FIG. 6, a transmitter 605 is configured to transmit information and a receiver 610 is configured to receive information. Transmitter 605 and receiver 610 may have a wireless interface, a wireline interface, or a combination thereof. In practice, transmitter 605 and receiver 610 might be implemented in a single unit of hardware.

A power setting unit 620 is configured to set a transmit power level, such as an initial transmit power level, for RNs controlled by communications device 600. A power control unit 622 is configured to initiate execution of a power control algorithm in communications device 600 as well as RNs controlled by communications device 600. Furthermore, power control unit 622 is configured to determine when to stop execution of the power control algorithm, such as determining that the power control algorithm has converged, a specified amount of time has elapsed, a specified number of iterations of the power control algorithm has occurred, and so on. A measurement unit 624 is configured to measure an indication of channel quality of a channel. A memory 630 is configured to store transmit power levels, results of the power control algorithm, and so forth.

The elements of communications device 600 may be implemented as specific hardware logic blocks. In an alternative, the elements of communications device 600 may be implemented as software executing in a processor, microprocessor, digital signal processor, controller, application specific integrated circuit, or so on. In yet another alternative, the elements of communications device 600 may be implemented as a combination of software and/or hardware.

As an example, transmitter 605 and receiver 610 may be implemented as a specific hardware block, while power setting unit 620, power control unit 622, and measurement unit 624 may be software modules executing in a processor 615, such as a microprocessor, a digital signal processor, a custom circuit, or a custom compiled logic array of a field programmable logic array.

Figure 7:
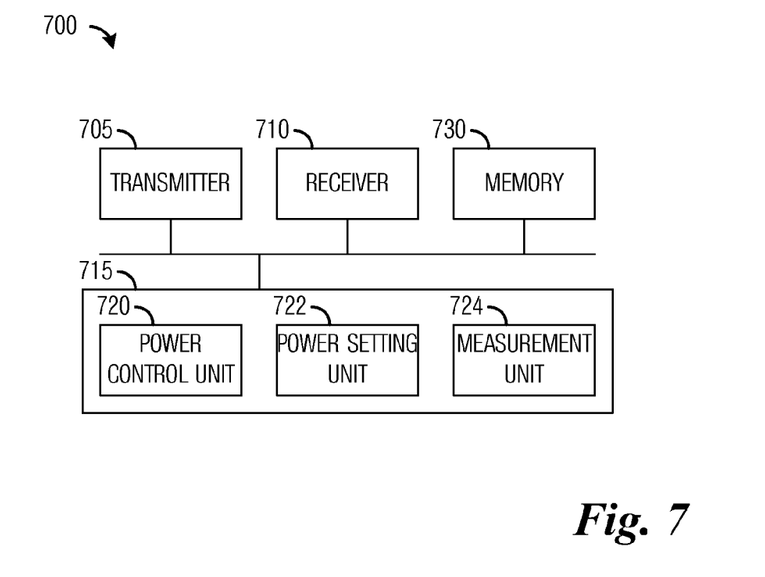
FIG. 7 illustrates an example second communications device according to example embodiments described herein.

FIG. 7 provides an illustration of a communications device 700. Communications device 700 may be an implementation of a RN. Communications device 700 may be used to implement various ones of the embodiments discussed herein. As shown in FIG. 7, a transmitter 705 is configured to transmit information and a receiver 710 is configured to receive information. Transmitter 705 and receiver 710 may have a wireless interface, a wireline interface, or a combination thereof. In practice, transmitter 705 and receiver 710 might be implemented in a single unit of hardware.

A power control unit 720 is configured to initiate execution of a power control algorithm in communications device 700 as well as MSs controlled by communications device 700. Furthermore, power control unit 720 is configured to determine when to stop execution of the power control algorithm, such as determining that the power control algorithm has converged, a specified amount of time has elapsed, a specified number of iterations of the power control algorithm has occurred, and so on. Power control unit 720 is further configured to initiate channel measurements by the MSs controlled by the communications device 700.

A power setting unit 722 is configured to update a transmit power level for transmissions from communications device 700 to MSs controlled by the communications device 700. Power setting unit 722 may make use of information about channel measurements made by the MSs to update the transmit power level. Power setting unit 722 may make use of power control commands (or power control recommendations) made by the MSs to update the transmit power level. A measurement unit 724 is configured to select signals, such as pilots, reference signals, preambles, and so on, for transmission to help the MSs make measurements of the channels. The signals may be broadcast signals or precoded signals. A memory 730 is configured to store transmit power levels, results of the power control algorithm, and so forth.

The elements of communications device 700 may be implemented as specific hardware logic blocks. In an alternative, the elements of communications device 700 may be implemented as software executing in a processor, microprocessor, digital signal processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while power control unit 720, power setting unit 722, and measurement unit 724 may be software modules executing in a processor 715, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for relay node communication, the method comprising:
    transmitting a signal at a transmit power level on a first channel from a relay node to a user equipment;
    receiving a message comprising a first indication of channel quality of the first channel at the transmit power level;
    determining a second indication of channel quality of a second channel between a communications controller and the relay node, wherein the first channel and the second channel are in a same multi-hop communication path; and
    altering the transmit power level of the first channel based on the first indication of channel quality and the second indication of channel quality to converge the channel quality of the first channel to a convergence value.

2. The method of claim 1, wherein the convergence value is the channel quality of the second channel.

3. The method of claim 1, wherein altering the transmit power level of the first channel substantially equalizes an achievable data rate of the first channel with an achievable data rate of the second channel, wherein the first indication of channel quality and the second indication of channel quality indicate achievable data rates of the first channel and the second channel, respectively.

4. The method of claim 3, wherein the altering the transmit power level of the first channel comprises attempting to maximize the achievable data rate of the first channel and the achievable data rate of the second channel.

5. The method of claim 1, further comprising receiving the transmit power level from the communications controller.

6. The method of claim 5, wherein the transmit power level received from the communications controller is equal to a maximum transmit power level of the relay node.

7. The method of claim 1, wherein the first indication of channel quality comprises a signal to interference plus noise ratio (SINR) value, a signal to noise ratio (SNR) value, a received signal strength value, a measured bit error rate, a measured frame error rate, channel state information, a channel state indicator, channel statistics, functions of channel statistics, or a combination thereof.

8. The method of claim 1, wherein the first indication of channel quality comprises a power control command or a power control recommendation.

9. The method of claim 8, wherein the power control command or the power control recommendation specifies a change in the transmit power level, and wherein altering the transmit power level comprises changing the transmit power level of the first channel by an amount equal to the change.

10. The method of claim 8, wherein the power control command or the power control recommendation specifies a new transmit power level, and wherein altering the transmit power level comprises setting the transmit power level of the first channel to be equal to the new transmit power level.

11. The method of claim 1, further comprising repeating the transmitting, the receiving, the determining, and the altering until a terminating condition is met.

12. The method of claim 11, wherein the terminating condition comprises a convergence of the channel quality of the first channel to the convergence value, a change between successive channel qualities of the first channel is less than a first threshold, a convergence of the transmit power level of the first channel to a second value, a change between successive transmit power levels of the first channel is less than a second threshold, or a combination thereof.

13. The method of claim 1, wherein the signal comprises a pilot signal, a reference signal, a preamble, or a combination thereof.

14. The method of claim 1, wherein an iteration comprises a performance of the transmitting, the receiving, the determining, and the altering, wherein the first indication of channel quality comprises a first signal to interference plus noise ratio (SINR) value and the second indication of channel quality comprises a second SINR value, and wherein altering the transmit power level comprises evaluating $$p_k^{(n)} = \max\{P_k^{min}, \min\{p_k^{(n-1)}, \alpha \frac{a_k}{b_k^{(n-1)}} p_k^{(n-1)}\}\},$$

where $P_k^{min}$ is a minimum transmit power level of a k-th relay node, $p_k^{(n-1)}$ is a transmit power level of the k-th relay node at an (n−1)-st iteration, $p_k^{(n)}$ is a transmit power level of the k-th relay node at an n-th iteration, $a_k$ is a SINR value of the second channel between the communications controller and the k-th relay node, $b_k^{(n-1)}$ is a SINR value of the first channel between the k-th relay node and the user equipment, and $\alpha$ is an adjustment factor.

15. The method of claim 14, wherein $\alpha$ is equal to 1.0 or 0 dB.

16. A method for communications controller operations, the method comprising:
    setting, at a communications controller, a first transmit power level for a transmission made by a relay node over a first channel between the relay node and a user equipment, wherein the relay node is controlled by the communications controller;
    transmitting, over a second channel between the communications controller and the relay node, a signal at a second transmit power level, wherein the first channel and the second channel are in a same multi-hop communication path;
    initiating an execution of a power control algorithm at the relay node to alter the first transmit power level based on a first indication of channel quality of the first channel and a second indication of channel quality of the second channel to converge the channel quality of the first channel to the channel quality of the second channel; and
    stopping the power control algorithm at the relay node when a stopping condition is met.

17. The method of claim 16, wherein the stopping condition comprises one or more of a convergence of the power control algorithm at the relay node, a timer indicating an amount of time that the relay node has spent executing the power control algorithm has elapsed, and a count of a number of times the relay node has performed the power control algorithm has met a threshold.

18. The method of claim 16, wherein initiating the power control algorithm comprises broadcasting a message comprising an instruction to initiate the power control algorithm, broadcasting a message comprising a time to initiate the power control algorithm, or broadcasting a message comprising an event, wherein the power control algorithm is initiated upon an occurrence of the event.

19. The method of claim 16, wherein stopping the power control algorithm comprises broadcasting a message comprising an instruction to stop the power control algorithm, or broadcasting a message comprising a time to stop the power control algorithm.

20. A relay node comprising:
a transmitter configured to transmit a signal at a transmit power level on a first channel from the relay node to a user equipment;
a receiver configured to receive a message comprising a first indication of channel quality of the first channel at the transmit power level; and
a processor coupled to the transmitter and to the receiver, the processor configured to determine a second indication of channel quality of a second channel between a communications controller and the relay node, wherein the first channel and the second channel are in a same multi-hop communication path, and configured to alter the transmit power level of the first channel based on the first indication of channel quality and the second indication of channel quality to converge the channel quality of the first channel to a convergence value.

21. The relay node of claim 20, wherein the convergence value is the channel quality of the second channel.

22. The relay node of claim 20, wherein the processor is configured to alter the transmit power level of the first channel by substantially equalizing an achievable data rate of the first channel with an achievable data rate of the second channel, wherein the first indication of channel quality and the second indication of channel quality indicate achievable data rates of the first channel and the second channel, respectively.

23. The relay node of claim 22, wherein the processor is configured to alter the transmit power level of the first channel by attempting to maximize the achievable data rate of the first channel and the achievable data rate of the second channel.

24. The relay node of claim 20, wherein the receiver is further configured to receive the transmit power level from the communications controller.

25. The relay node of claim 20, wherein the first indication of channel quality comprises a signal to interference plus noise ratio (SINR) value, a signal to noise ratio (SNR) value, a received signal strength value, a measured bit error rate, a measured frame error rate, channel state information, a channel state indicator, channel statistics, functions of channel statistics, or a combination thereof.

26. The relay node of claim 20, wherein the first indication of channel quality comprises a power control command or a power control recommendation, wherein the power control command or the power control recommendation specifies a change in the transmit power level, and wherein the processor is configured to alter the transmit power level by changing the transmit power level by an amount equal to the change.

27. The relay node of claim 20, wherein the first indication of channel quality comprises a power control command or a power control recommendation, wherein the power control command or the power control recommendation specifies a new transmit power level, and wherein the processor is configured to alter the transmit power level by setting the transmit power level to be equal to the new transmit power level.

28. The relay node of claim 20, wherein the transmitter is configured to transmit the signal, the receiver is configured to receive the message, and the processor is configured to determine the second indication of channel quality and to alter the transmit power level of the first channel until a terminating condition is met, wherein the terminating condition comprises a convergence of the channel quality of the first channel to the convergence value, a change between successive channel qualities of the first channel is less than a first threshold, a convergence of the transmit power level of the first channel to a second value, a change between successive transmit power levels of the first channel is less than a second threshold, or a combination thereof.

29. A communications controller comprising:
a processor configured to set a first transmit power level for a transmission made by a relay node over a first channel between the relay node and a user equipment, wherein the communications controller controls the relay node, and configured to initiate an execution of a power control algorithm at the relay node, wherein the power control algorithm alters the first transmit power level based on a first indication of channel quality of the first channel and a second indication of channel quality of a second channel between the communications controller and the relay node to converge the channel quality of the first channel to the channel quality of the second channel, wherein the first channel and the second channel are in a same multi-hop communications path and configured to stop the power control algorithm at the relay node when a stopping condition is met; and
a transmitter coupled to the processor, the transmitter configured to transmit a signal at a second transmit power level over the second channel.

30. The communications controller of claim 29, wherein the stopping condition comprises one or more of a convergence of the power control algorithm at the relay node, a timer indicating an amount of time that the relay node has spent executing the power control algorithm has elapsed, and a count of a number of times the relay node has performed the power control algorithm has met a threshold.

31. The communications controller of claim 29, wherein the processor is configured to initiate the power control algorithm by generating a first message comprising an instruction to initiate the power control algorithm, generating a second message comprising a time to initiate the power control algorithm, or generating a third message comprising an event, wherein the power control algorithm is initiated upon an occurrence of the event, and wherein the transmitter is further configured to transmit the first message, the second message, or the third message.

32. The communications controller of claim 29, wherein the processor is configured to stop the power control algorithm by generating a fourth message comprising an instruction to stop the power control algorithm, or generating a fifth message comprising a time to stop the power control algorithm, and wherein the transmitter is further configured to transmit the fourth message or the fifth message.

* * * * *